United States Patent [19]

Winter

[11] Patent Number: 4,494,883
[45] Date of Patent: Jan. 22, 1985

[54] BEARING SURFACE FOR THINWALLED TUBE

[75] Inventor: David C. Winter, Des Moines, Iowa

[73] Assignee: Deere & Company, Moline, Ill.

[21] Appl. No.: 518,316

[22] Filed: Jul. 29, 1983

Related U.S. Application Data

[63] Continuation of Ser. No. 278,524, Jun. 29, 1981, abandoned.

[51] Int. Cl.³ .................. F16C 35/02; F16C 33/08
[52] U.S. Cl. ........................... 384/439; 384/276; 384/279
[58] Field of Search ............... 384/282, 439, 441, 428, 384/276, 279; 403/52, 67–72, 119, 167, 187, 220

[56] References Cited

U.S. PATENT DOCUMENTS

| | | |
|---|---|---|
| 528,278 | 10/1894 | Roberts . |
| 1,945,622 | 2/1934 | Sneed ........................... 384/440 X |
| 3,124,370 | 3/1964 | Traugott ........................ 403/161 X |
| 3,253,671 | 5/1966 | Fielding .............................. 180/51 |
| 3,298,750 | 1/1967 | Storch .................................. 308/2 |
| 3,342,507 | 9/1967 | Koch et al. ..................... 308/120 R |
| 3,748,685 | 7/1973 | Edele et al. .................... 403/158 X |
| 4,039,232 | 8/1977 | Vinciguerra ...................... 308/36.1 |
| 4,219,916 | 9/1980 | Kincel .............................. 29/149.5 |
| 4,339,636 | 7/1982 | Cleaveland et al. ............. 308/21 X |

Primary Examiner—Lenard A. Footland
Assistant Examiner—Thomas R. Hannon

[57] ABSTRACT

A bearing surface for a hollow link of rectangular cross section including a pair of replaceable axially aligned bushings press-fitted into a pair of seats swaged in opposite sidewalls of the link.

11 Claims, 4 Drawing Figures

BEARING SURFACE FOR THINWALLED TUBE

This application is a continuation of application Ser. No. 278,524, filed June 29, 1981 now abandoned.

BACKGROUND OF THE INVENTION

The present invention relates generally to a bearing surface for a joint and more specifically to a bearing surface for a thin-walled tube utilized with a support linkage for an agricultural implement.

Many farm implements, for example, row crop cultivators, typically include an elongated fore-and-aft extending link pivotally connected at one end to a frame-supported mounting bracket and at the opposite end to coupler plates which support a tool-carrying rig beam. Usually two links are spaced vertically to form four-bar linkage structure with the mounting bracket and coupler plates so that the rig beam remains in a preselected angle with respect to the ground as the tools penetrate the soil and as the links are pivoted up from the field-working position to the transport position. The links are commonly fabricated from solid metal bars and are pinned between the bracket and plates by pivots such as bolts or the like. The bars are not only heavy, but are also relatively thin, and any looseness or play in the pivots results in undesirable side sway of the rig beam and tools connected thereto. The coupler plates must be tight enough against the bars to prevent excessive side movement, but must also be loose enough to permit the rig beam to be raised and lowered and to float with the ground level when a gauge wheel is utilized.

Recently, hollow tubular links which are wider and lighter than the solid bars have been employed with many implements to reduce weight and side sway. The tubular links have a rectangular or square cross section with upright sidewalls which are relatively thin compared to the overall width of the tube. Heretofore, it has been necessary to drill axially aligned holes in the opposite sidewalls and weld a bushing in place between the sidewalls to support each pivot. Long bushings extend from wall to wall, and fabrication of each pivot area requires two welding steps including one for each wall. Once the bushing is welded in place, it is difficult or impossible to replace if it becomes worn or damaged. A complete link assembly often has to be replaced if one bushing is damaged, and the links are relatively expensive because of the bushings and the labor required for fabrication. Additional replaceable wear bushings have been utilized within the welded bushings, but the additional components add cost and increase the time required to fabricate the assembly. Any play between the bushings and the pivot pin, which may be caused by wear or by an improper fit of one or more of the components, may easily cause a side sway problem.

BRIEF DESCRIPTION OF THE INVENTION

It is, therefore, an object of the present invention to provide an improved link structure for an implement which overcomes the above-mentioned problems.

It is another object to provide an improved link structure for an implement which is lighter and less costly to fabricate than at least some of the presently available structures and which provides a sturdy pivot area to reduce or eliminate side sway.

It is a further object of the present invention to provide an improved bearing assembly for the pivot areas of link structure utilized with agricultural implements.

It is yet another object of the invention to provide an improved bearing assembly for pivotally connecting a thin-walled tube to a bracket or the like. It is still a further object to provide such an assembly wherein the need to weld a bushing to the tube is eliminated and wherein individual bearing surfaces are easily replaceable.

A bearing surface is provided in the opposed sidewalls of a thin-walled tube of rectangular cross section by drilling a pair of aligned pilot holes in the walls and thereafter swaging the holes to enlarge them to slightly less than twice the diameter of the pilot holes. The swaged holes provide opposed inwardly flanged support areas, and a pair of oil-impregnated, heat-treated bushings are pressed into the holes to receive the pivot pin or bolt which extends through the sides of the bracket or coupler plates located outwardly of the tube. The swaged holes provide excellent support for the individual bushings and eliminate the need for a bushing extending between, and welded to, the sidewalls of the tube. No added wear bushings are required, and if a bushing becomes worn or damaged, it can be easily removed and replaced with a new bushing so that the entire link does not have to be replaced. Eliminating a long bushing between the sidewalls and eliminating several welding steps reduces the cost of the assembly. The link is relatively light and inexpensive, and it provides good resistance to side sway.

In one alternate embodiment of the invention, the swaged hole itself acts as the bearing surface for the pivot pin to eliminate the press-fit bushings. In another embodiment, the bushings are fixed for rotation with the pivot pin and rotate relative to the swaged holes.

These and other objects, features and advantages of the present invention will become apparent from the description which follows and from the drawings.

DESCRIPTION OF THE PREFERRED EMBODIMENT

Figure 1:
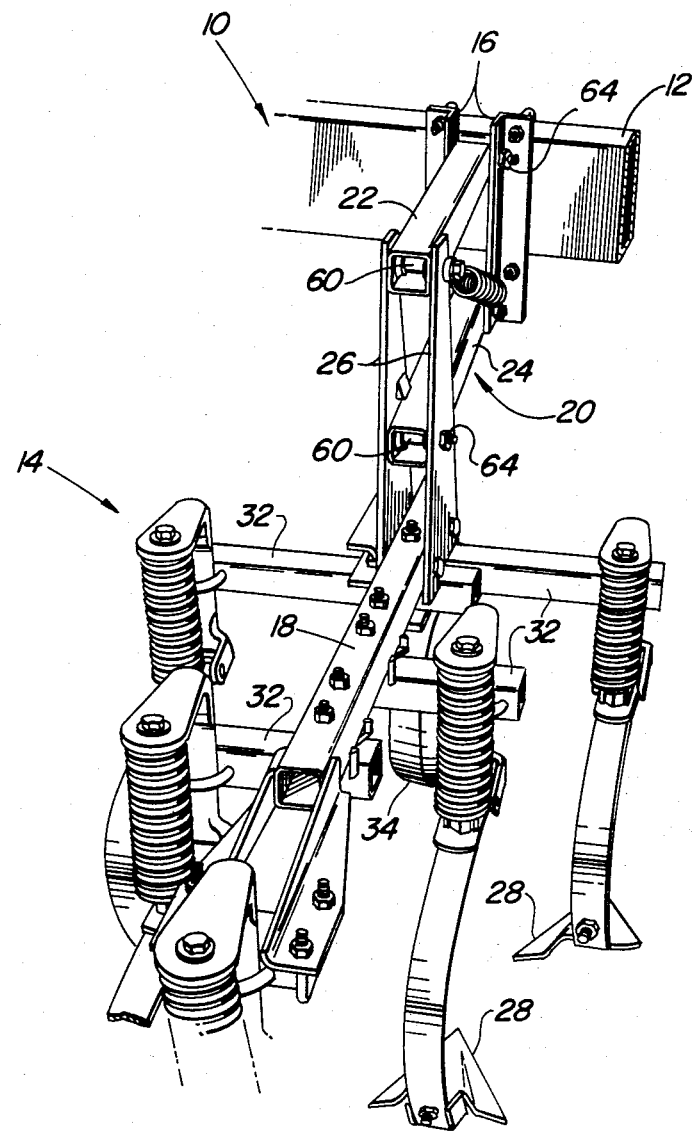
FIG. 1 is a perspective view of a portion of a cultivator rig assembly utilizing the present invention.

Referring to FIG. 1, therein is shown a portion of a row-crop cultivator 10 including a main transverse beam 12 adapted for connection to a towing vehicle such as by a three-point hitch (not shown) for forward movement through a field of crops planted in parallel rows. A plurality of cultivator rig assemblies 14 are supported rearwardly from the beam 12 by rig hangers or brackets 16. Each rig assembly 14 includes a fore-and-aft extending rig beam 18 supported by four-bar linkage structure 20 including upper and lower parallel links 22 and 24 pivotally connected at opposite ends to the rig hanger 16 and to a pair of coupler plates 26 spaced on opposite sides of the aft ends of the links 22 and 24. The plates 26 are rigidly bolted to the rig beams 18. Earthworking tools 28 for tilting the soil between rows of plants are carried on cross arms 32 which are connected to the rig beam 18. A gauge wheel 34 maintains the rig beam 18 a preselected distance above the ground. The four-bar linkage structure 20 pivots to permit the gauge wheel to follow the contour of the ground.

Figure 2:
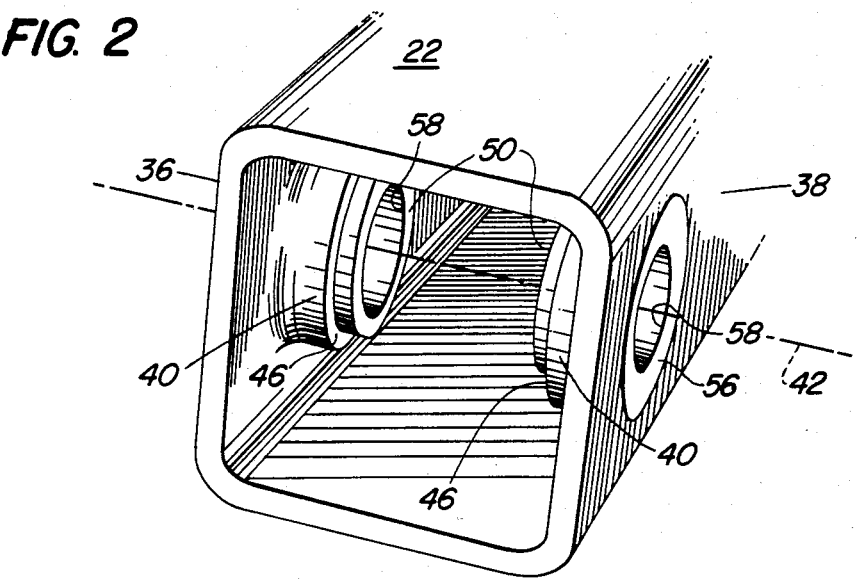
FIG. 2 is a perspective view of an end of one of the links utilized with the rig assembly of FIG. 1.

The parallel links 22 and 24 are substantially identical and are fabricated from square tubular metal stock having opposed sidewalls 36 and 38. A pair of circular bushing-receiving seats 40 are formed in the sidewalls 36 and 38 near the ends of the link. Each pair of seats 40 is centered on a transverse axis 42, and the circumference of each seat is substantial compared to the vertical dimension of the sidewall. Each seat 40 is formed by first drilling a pilot hole in the sidewall and then swaging the hole to form a rounded outer portion 44 and a circular inner lip 46. The pilot hole is made slightly larger than one-half the final diameter of the swagged hole. By way of example, for a two-inch square tube of about 5/32" wall thickness, to provide the lip 46 with an inner circumference of one inch, a 9/16" pilot hole is drilled. During the step of swaging, the lip is formed relatively uniformly and without cracks to provide a sturdy inwardly directed support surface which receives a bushing 50. The bushing 50, which is oil-impregnated and heat-treated for hardness and wear resistance, includes an axially inwardly directed cylindrical portion 52 having a diameter substantially equal to the inner diameter of the circular lip 46 so that a tight fit is provided in the seat 40. The bushing 50 is flared outwardly at 54 to conform to the shape of the rounded outer portion 44 of the seat 40. The bushing 50 is pressed into the seat 40 so that its axially outward surface 56, which preferably is flat, is generally flush with, or slightly recessed with respect to, the outer surface of the corresponding sidewall (FIG. 2). The bushing 50 extends axially inwardly beyond the inner edge of the lip 46 and includes a circular bore 58 with an axis corresponding to the axis 42. The pairs of bushings 50 in each end of the tubular links are axially aligned to receive the shank of a pivot pin or bolt 60. For the example set forth above, the axial length of each bushing is about 9/16", and the cylindrical portion 52 extends inwardly beyond the edge of the lip 46 approximately ¼".

In the preferred embodiment, the bolt 60 is inserted through holes 62 in the coupler plates 26 (or in the flanges of the rig hanger bracket 16) and through the corresponding pair of bushings 50 in the link 22 or 24. A prevailing torque steel locknut 64 is threaded on the bolt 60 to sandwich the end of the link between the plates. The nut 64 is tightened sufficiently to prevent side sway while permitting the link to pivot with respect to the plates. The bolt 60 rotates relative to the bushing 50 as the link pivots. The above-described bearing structure with bushings 50 provides substantially identical resistance to side sway as the conventional welded arrangement with a single bushing that extends completely through the tube, but is less expensive and time-consuming to fabricate and easier to repair.

Figure 4:
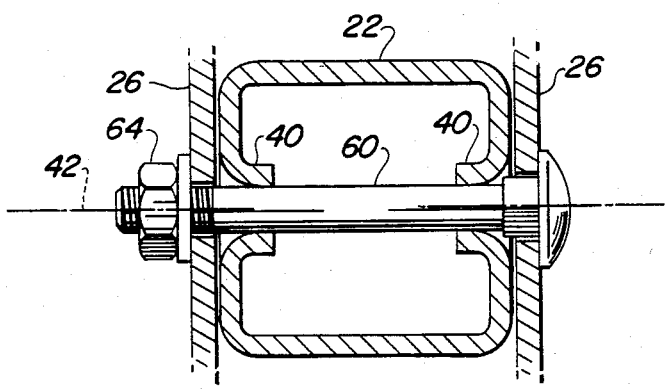
FIG. 4 is a cross sectional view of the end portion of a link utilizing an alternate embodiment of the invention wherein the swaged hole provides the bearing surface for the pivot pin.

In an alternate embodiment of the invention (FIG. 4) the swaged hole or seat 40 itself acts as the bearing surface for the pivot pin 60, which is preferrably a grease bolt for providing lubrication in the area of contact between the seat and the pivot. The area of the tube in which the seat 40 is formed is heat treated for hardness and wear resistance.

Figure 3:
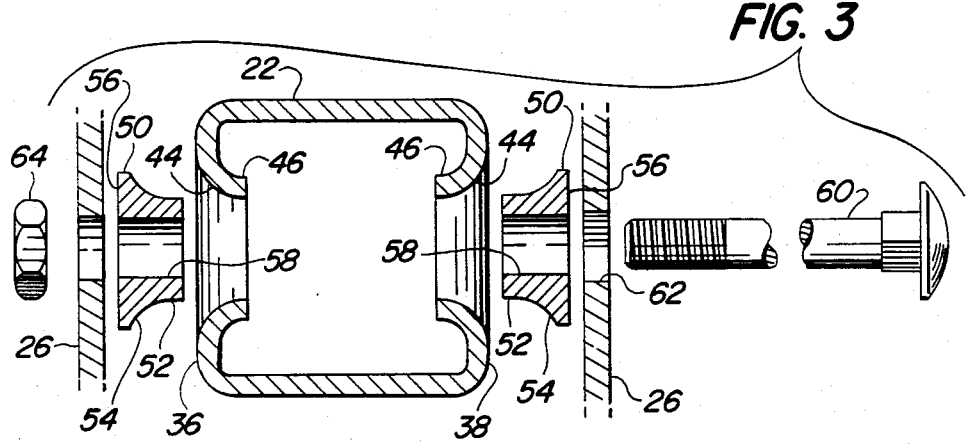
FIG. 3 is an exploded view of the end portion of one of the links of FIG. 1.

In another embodiment similar to FIG. 3, relative rotation between the bushing 50 and the pivot pin 60 is prevented by slot and key structure (not shown) or other conventional arrangement for locking the bushing against rotation on the pin. Therefore, rather than the pin 60 rotating in the bushing 50 as in the previously discussed embodiments, the bushing rotates in the seat 40. The seat 40 must be machined or cleaned to provide a smooth, uniform surface which will not prematurely wear away the bearing surface of the bushing 50.

Having described the preferred embodiment, it will be apparent that modifications can be made without departing from the scope of the invention as defined in the accompanying claims.

I claim:

1. In a hollow elongated tubular link for an agricultural implement, the link adapted for sandwiching between a pair of plates and including parallel opposed sidewalls each having a thickness substantially less than the distance between the sidewalls and transverse walls connecting the sidewalls, pivot bearing structure comprising: a pair of circular axially aligned seats formed integrally with and recessed inwardly from the opposed sidewalls, each seat having a radius substantial compared to the dimension of the sidewall perpendicular to the axis of the link, a pair of individual one-piece bushings pressed into and non-rotatably supported in the respective seats, said bushings having axially aligned bores, wherein each bushing includes an axially outermost end flush with or slightly recessed with respect to the corresponding sidewall, a flared rim portion adjacent the outermost end, an inner cylindrical portion having a diameter less than the rim portion, and an axially inwardmost end located inwardly of the sidewall, wherein each corresponding seat includes a rounded portion extending inwardly from the sidewall for receiving the flared portion closely adjacent the transverse connecting walls and an inner portion extending axially inwardly from the sidewall for receiving the cylindrical portion, said rounded portion cooperating with the flared portion to secure the latter against rocking and axial motion with respect to the sidewalls so that said inwardmost ends are axially spaced a fixed distance apart, and pivot pin means mounted for rotation with respect to the bushings extending through the bores and connected to the plates for maintaining the plates parallel and closely adjacent the link sidewalls while permitting the link to pivot with respect to the plates.

2. The invention as set forth in claim 1 wherein each seat is fabricated from a portion of the corresponding sidewall, said portion including a swagged aperture defining said seat.

3. The invention as set forth in claim 2 wherein the sidewall portion includes a circular inner lip projecting axially inwardly from the sidewall and terminating outwardly of the axially inwardmost end of the bushing.

4. The invention as set forth in claim 2 wherein each seat is fabricated by drilling a pilot hole in the sidewall and thereafter swagging the hole to increase the diameter and axial length thereof.

5. The invention as set forth in claim 4 wherein the pilot hole is approximately half the diameter of the seat and the swagged aperture has an axial length approximately twice the thickness of the sidewall.

6. The invention as set forth in claim 1 wherein the diameter of each bushing is substantially greater than one-half the dimension of the sidewall as measured along a line perpendicular to the axis of the link.

7. The invention as set forth in claim 1 wherein the bushing is fabricated from heat-treated, oil-impregnated metal.

8. In an elongated link for an agricultural implement having a hollow generally rectangular cross section and adapted for pivotal connection to support structure, the link including opposite sidewalls with inner and outer surfaces spaced substantially less than the distance between the sidewalls and transverse walls connecting the sidewalls, said support structure including plate members closely adjacent and generally parallel to said outer surfaces, pivot bearing structure comprising: a bushing seat formed in each sidewall, the seats including circular lip structure aligned with each other on an axis perpendicular to the sidewalls extending inwardly beyond the inner surface, and a rounded portion recessed inwardly from the outer surface of the sidewall, said rounded portion including opposed portions located closely adjacent the transverse walls and forming diametrically opposed U-shaped sections with said transverse walls and the lip structure, a separate one-piece apertured bushing pressed into and non-rotatably supported in each seat and including a cylindrical portion extending through the lip structure and a radially flared portion substantially conforming to the shape of, and supported within the rounded recessed portion, said bushing having a flat, axially outwardly directed surface flush with or recessed slightly with respect to the outer surfaces and pin means extending through the bushings and connected to the support structure for permitting the link to pivot with respect to the support structure while maintaining the plates closely adjacent the outer surfaces to prevent sway, said pin means having a maximum outer diameter between the lip structure less than or equal to the diameter of the aperture for permitting insertion into and removal from the bushings.

9. The invention as set forth in claim 8 wherein the bushings include axially inwardly directed faces offset axially from each other within the link.

10. The invention as set forth in claim 9 wherein the inwardly directed faces are located axially inwardly of the lip structure.

11. The invention as set forth in claim 8 wherein the bushing seats are fabricated by swagging holes in the opposite sidewalls.

* * * * *